United States Patent [19]
Yokoyama

[11] Patent Number: 5,537,500
[45] Date of Patent: Jul. 16, 1996

[54] TWO-WAY LINE MONITOR

[75] Inventor: Jun Yokoyama, Tokyo, Japan

[73] Assignee: NEC Corporation, Japan

[21] Appl. No.: 364,655

[22] Filed: Dec. 27, 1994

[30] Foreign Application Priority Data

Dec. 27, 1993 [JP] Japan .................................. 5-331167

[51] Int. Cl.⁶ ..................................................... G02B 6/42
[52] U.S. Cl. .............................. 385/31; 385/39; 385/47; 385/48
[58] Field of Search ..................... 385/31, 36, 44, 385/49, 39, 12, 15, 47, 48; 340/870.28, 870.29; 356/218

[56] References Cited

FOREIGN PATENT DOCUMENTS

| 2421375 | 10/1979 | France . |
|---|---|---|
| 3228910 | 2/1984 | Germany . |
| 3811029 | 10/1989 | Germany . |
| 60-126607 | 7/1985 | Japan . |

*Primary Examiner*—K. Hantis
*Attorney, Agent, or Firm*—Hayes, Soloway, Hennessey, Grossman & Hage

[57] ABSTRACT

A two-way line monitor has a signal beam splitter, first and second optical sensors and a mirror. The beam splitter is positioned on the light axis and angled so as to receive first and second input lights at 20 to 40 degrees of the angle of incidence. The first and second optical sensors arranged so as to receive first and second sample lights, reflected from the beam splitter and the mirror, at around 20 degrees of the angle of incidence.

4 Claims, 3 Drawing Sheets 5,537,500

TWO-WAY LINE MONITOR

FIELD OF THE INVENTION

This invention relates to a two-way line monitor, and particularly to an improved two-way line monitor having a simple structure and a precise sensing quality.

BACKGROUND OF THE INVENTION

In general, an optical communication system includes a line monitor for sampling and monitoring a part of transmission signal in order to control the power of the transmission signal and detect errors in the communication. A two-way line monitor is used in a two-way optical communication system also to monitor a reflected light.

According to some conventional two-way line monitors, there are disadvantages in that it is difficult to sense the transmission light precisely and the monitor may be complicated in structure, for example, two beam splitters are required to sense lights.

SUMMARY OF THE INVENTION

Accordingly, it is an object of the invention to provide a two-way line monitor by which a transmission light can be sensed and monitored precisely.

It is another object of the invention to simplify the structure of a two-way line monitor.

According to the invention, a two-way line monitor has a single beam splitter, first and second optical sensors and a mirror. The beam splitter is angled so as to receive first and second input lights at 20 to 40 degrees of the angles of incidence. The first and second optical sensors arranged so as to receive first and second sample lights, reflected from the beam splitter and the mirror, at around 20 degrees of the angle of incidence.

That is, according to an aspect of the invention, a two-way line monitor includes first and second input/output terminals which guide lights along the same light axis so that a first input light is supplied from the first input/output terminal to the second input/output terminal and a second input light is supplied from the second input/output terminal to the first input/output terminal; first and second optical sensors arranged to have sensing surfaces facing the same direction in parallel to each other; a beam splitter for splitting the first input light into a first sample light to be supplied to the first optical sensor and a first output light to be supplied to the second output terminal and for splitting the second input light into second sample light to be supplied to the second optical sensor and a second output light to be supplied to the first input/output terminal, the beam splitter being angled so as to receive the first and second input lights at 20 to 40 degrees of the angle of incidence; and reflection means for reflecting the second sample light, reflected from the beam splitter, to the second optical sensor, the reflection means being arranged to receive the second sample light at around 20 degrees of the angle of incidence; wherein the first and second optical sensors are positioned so as to receive the first and second sample lights at around 20 degrees of the angle of incidence.

The reflection means may damp the second sample light. The beam splitter is angled so as to receive the first and second input lights at approximately 35 degrees of the angle of incidence.

According to another aspect of the invention, a two-way line monitor includes first and second input/output terminals which guide lights along the same light axis so that a first input light is supplied from the first input/output terminal to the second input/output terminal and second input light is supplied from the second input/output terminal to the first input/output terminal; first and second optical sensors arranged to have sensing surfaces opposing to each other; and a single beam splitter positioned on the light axis for splitting the first input light into a first sample light to be supplied to the first optical sensor and a first output light to be supplied to the second output terminal and for splitting the second input light into second sample light to be supplied to the second optical sensor and a second output light to be supplied to the first input/output terminal, the beam splitter being angled so as to receive the first and second input lights at 20 to 40 degrees of the angle of incidence; wherein the first and second optical sensors are positioned so as to receive the first and second sample lights at approximately 20 degrees of the angle of incidence.

DESCRIPTION OF THE PREFERRED EMBODIMENTS

Figure 1:
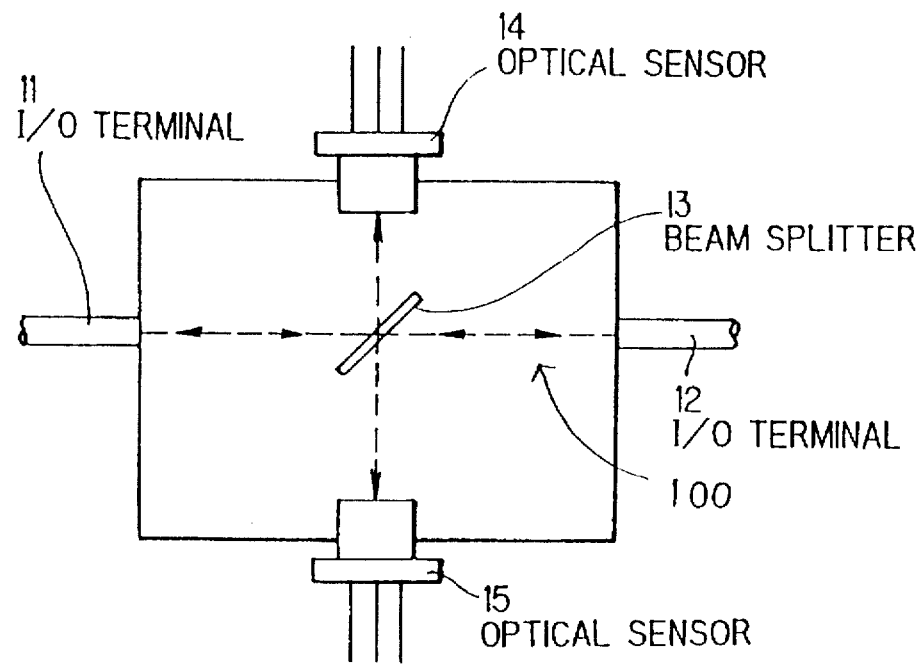
FIG. 1 is a conceptual diagram illustrating a conventional two-way line monitor.

FIG. 1 shows a conventional two-way line monitor, which includes first and second I/O (Input/Output) terminals 11 and 12 arranged to have the same light axis 100, a beam splitter 13 arranged on the light axis 100, and first and second optical sensors 14 and 15 positioned to be opposite to each other.

In operation, when a first input signal light is supplied from the first I/O terminal 11 to the beam splitter 13, the light is split into a first sample light and a first output light. The first sample light and the first output light are supplied to the first optical sensor 14 and the second I/O terminal 12, respectively when a second input signal light is supplied from the second I/O terminal 12 to the beam splitter 13, the light is split into a second sample light and a second output light. The second sample light and the second output light are supplied to the second optical sensor 15 and the first I/O terminal 11, respectively.

According to the conventional two-way line monitor, the first and second sample lights respectively reach sensing surfaces of the first end second optical sensors 14 and 15 at 90 degrees of the angle of incidence. Therefore, a part of each sample light is reflected from the sensing surface of the sensor, and is supplied to the other sensor. That makes the sensing precision of the sensors worse.

Figure 2:
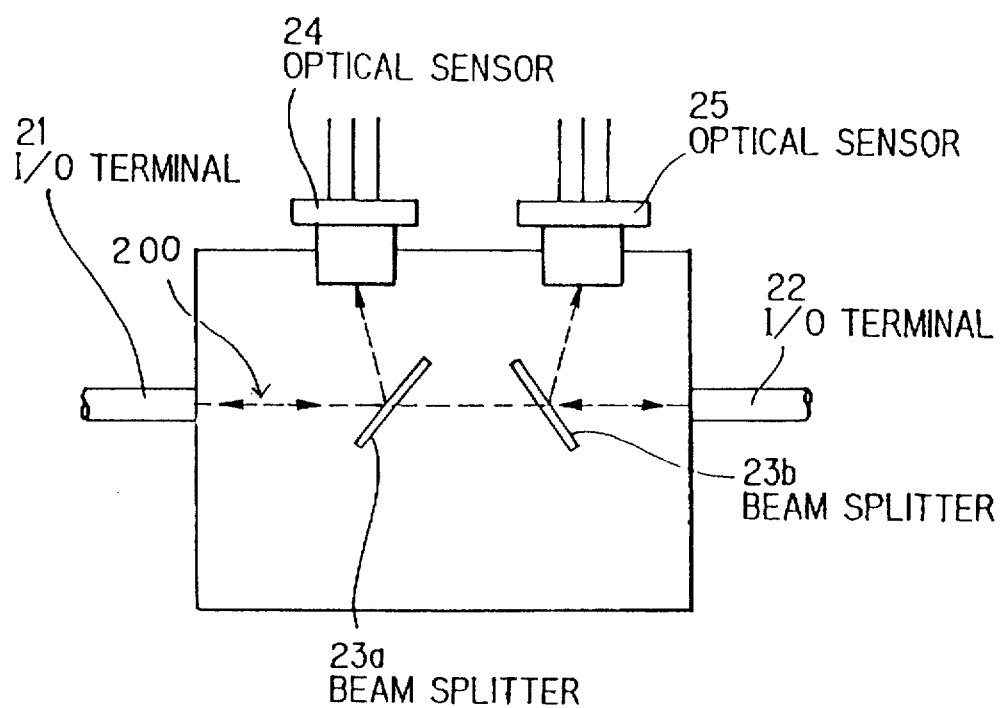
FIG. 2 is a conceptual diagram illustrating another conventional two-way line monitor.

FIG. 2 shows another conventional two-way line monitor, which include first and second I/O (Input/Output) terminals 21 and 22 arranged to have the same light axis 200, first and second beam splitters 23a and 24b arranged on the light axis 200, and first and second optical sensors 24 and 25 positioned in parallel to each other so as to have sensing surfaces facing the same direction in parallel to each other.

In operation, when a first input signal light is supplied from the first I/O terminal 21 to the beam splitter 23a, the light is split into a first sample light and a first output light. The first sample light is supplied to the first optical sensor 24, and the first output light passes through the second beam splitter 23b and reaches the second I/O terminal 22. When a second input signal light is supplied from the second I/O terminal 22 to the second beam splitter 23b, the light is split into a second sample light and a second output light. The second sample light is supplied to the second optical sensor 25, and the second output light passes through the first beam splitter 23a and reaches the first I/O terminal 21.

According to the conventional two-way line monitor, the first and second sample lights are angled relative to the first and second optical sensors 24 and 25. Each of the first and second output lights passes through both the first and second beam splitters 23a and 23b, so that the output lights lose great amount of light power thereby.

Figure 3:
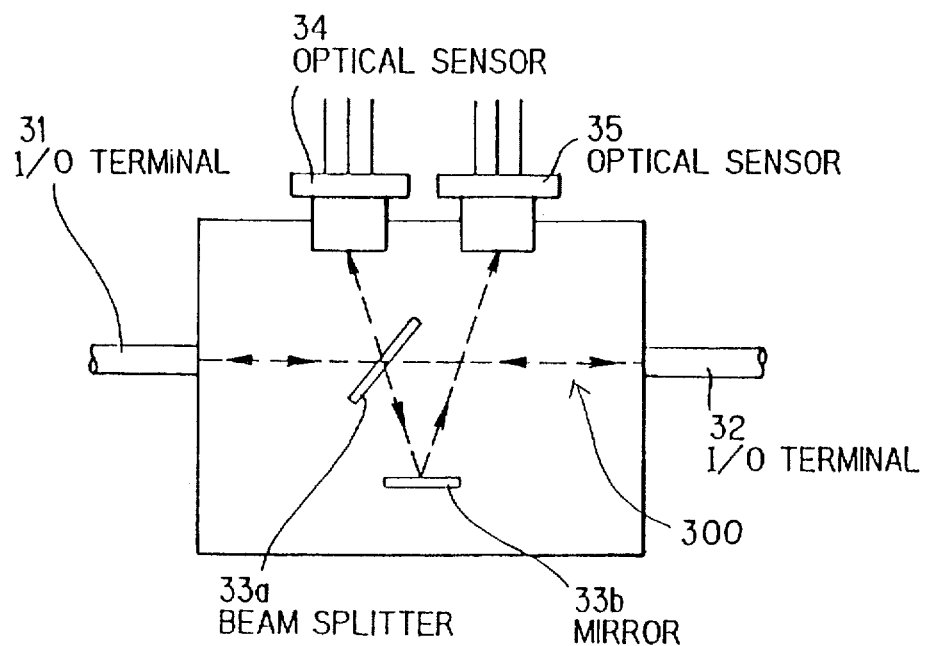
FIG. 3 is a conceptual diagram illustrating a two-way line monitor of a first preferred embodiment according to the invention.

FIG. 3 shows a two-way line monitor of a first preferred embodiment according to the invention, which includes first and second I/O (Input/Output) terminals 31 and 32 arranged to have the same light axis 300, a beam splitter 33a arranged on the light axis 300, a mirror 33b positioned so as to receive a light reflected from the beam splitter 33a, and first and second optical sensors 34 and 35 positioned in parallel to each other so as to have sensing surfaces facing the same direction in parallel to each other.

Figure 4:
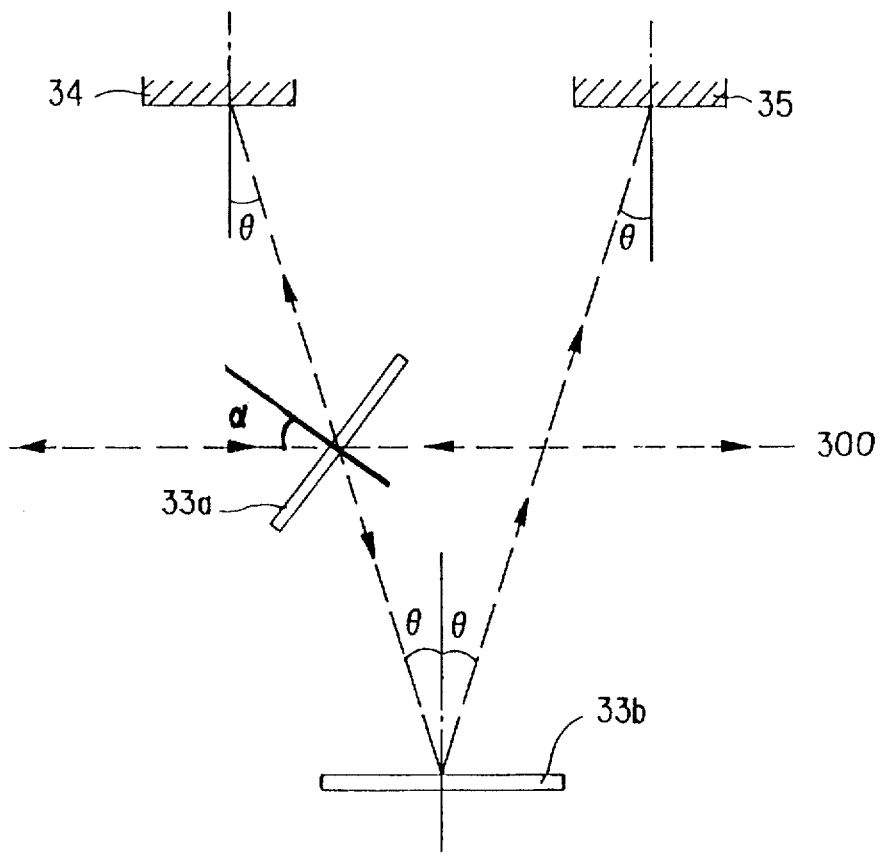
FIG. 4 is an explanatory diagram showing the operation of the two-way line monitor shown in FIG. 3.

As shown in FIG. 4, the beam splitter 33a is designed to split a 1.55 μm wavelength of signal light into 90% and 10% and is positioned to received a light at 35 degrees of the angle of incidence, indicated by "α" in the figure. The mirror 33b is positioned to receive a light at 20 degrees of the angle of incidence, indicated by "θ" in the figure. Each of the first and second optical sensors 34 and 35 is of ternary PIN-FD having a sensitivity of 1 A/W.

In operation, when a first input signal light, having a strength of +5dBm and a wavelength of 1.55 μm, is supplied from the first I/O terminal 31 to the beam splitter 33a, 10% of the light is reflected therefrom as a first sample light, and 90% thereof passes through the beam splitter 33a as a first output light. The first sample light is supplied to the first optical sensor 34, and the first output light is supplied to the second I/O terminal 32. When a second input signal light, having a strength of −15 dBm and a wavelength of 1.55 μm, is supplied from the second I/O terminal 32 to the beam splitter 33a, 10% of the light is reflected therefrom as a sample light, and 90% thereof passes through the beam splitter 33a as a second output light. The second sample light is supplied to the mirror 33b, and is reflected therefrom to the second optical sensor 35. The second output light is supplied to the first I/O terminal 31. In the first and second optical sensors 34 and 35, 300 μA of current flows, respectively.

In the conventional two-way line monitor shown in FIG. 1, about 1% of the first sample light is reflected from the sensing surface of the first optical sensor 14, and then the reflected light is supplied into the second optical sensor 15 opposing to the first optical sensor 14. In contrast with this, in the above mentioned first preferred embodiment, each sample light is supplied to the corresponding optical sensor at 20 degrees of the angle of incidence, so that the amount of light reflected from one optical sensor to the other optical sensor is decreased by more than 30 dB as compared to that by the conventional technology, that is less than 3 nA.

If the angle of incidence forwarding to each beam splitter is 45 degrees, at least two beam splitter are required in order to arrange two optical sensors facing the same direction, as shown in FIG. 2. Otherwise, if the angle of incidence forwarding to each beam splitter is lower than 20 degrees, each light supplied to the corresponding optical sensor has a 50 degrees of the angle of incidence, and therefore too much light is reflected from the sensing surfaces of the optical sensors.

In the first preferred embodiment, the two-way line monitor may further includes a damping plate for damping the second sample light reflected from the beam splitter 33a. The damping plate is useful especially in case that the second input light has high level of power, for example, in case that the two-way line monitor is applied to an optical fiber amplifier in which the first and second optical sensors are used as an output monitor and a reflection monitor, respectively. Technically, if the first input light has +15 dBm of light power, 10% of the light is reflected from the beam splitter.

Figure 5:
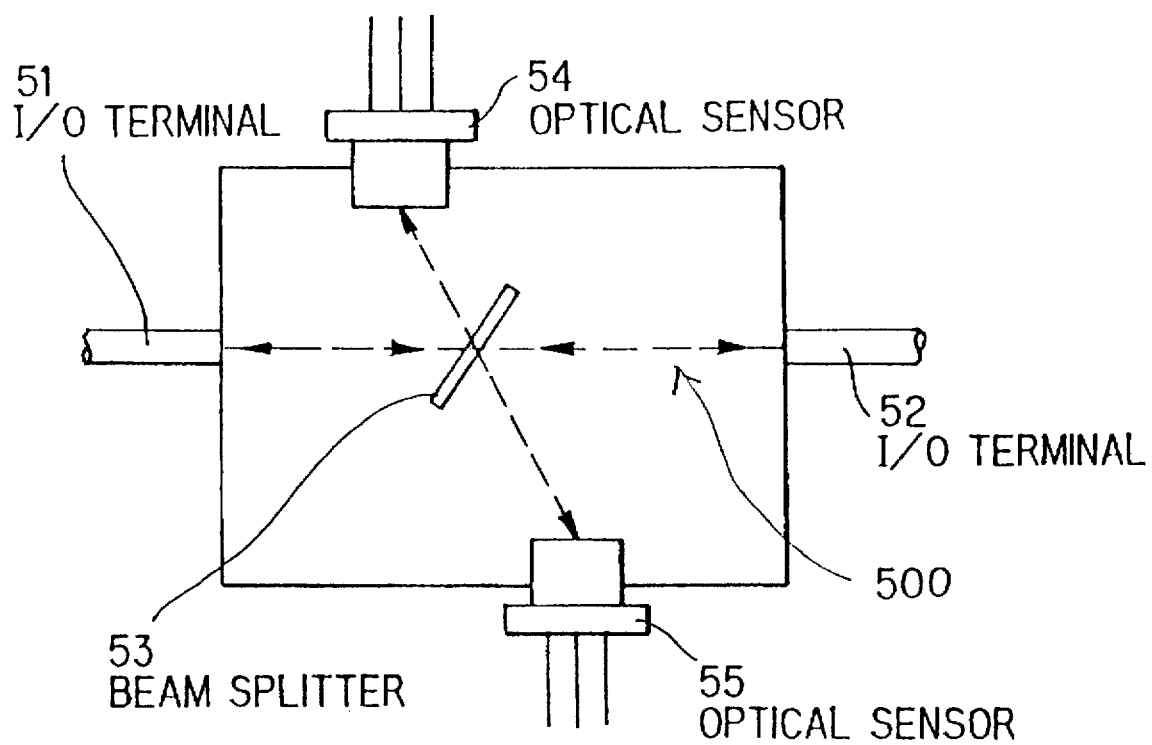
FIG. 5 is a conceptual diagram illustrating a two-way line monitor of a second preferred embodiment according to the invention.

FIG. 5 shows a two-way line monitor of a second preferred embodiment according to the invention, which includes first and second I/O (Input/Output) terminals 51 and 52 arranged to have the same light axis 500, a beam splitter 53 arranged on the light axis 500, and first and second optical sensors 54 and 55.

The beam splitter 53 is angled so as to receive each of first and second input lights, supplied from the first and second I/O terminals 51 and 52, at 35 degrees of the angle of incidence. Each of the first and second optical sensors 54 and 55 is arranged so as to receive light reflected from the beam splitter 53 at 20 degrees of the angle of incidence.

In operation, when a first input signal light is supplied from the first I/O terminal 51 to the beam splitter 53, 10% of the light is reflected therefrom as a first sample light and 90% of the light passes through the beam splitter 53 as a first output light. The first sample light is supplied to the first optical sensor 54, and the first output light is supplied to the second I/O terminal 52. When a second input signal light is supplied from the second I/O terminal 52 to the beam splitter 53, 10% of the light is reflected therefrom as a sample light and 90% thereof passes through the beam splitter 53 as a second output light. The second output light is supplied to the first I/O terminal 51, and the second sample light is supplied to the second optical sensor 55.

Although the invention has been described with respect to specific embodiments for complete and clear disclosure, the appended claims are not to be thus limited but are to be construed as embodying all modification and alternative constructions that may occur to one skilled in the art which fairly fall within the basic teaching herein set forth.

What is claimed is:

1. A two-way line monitor, comprising:

a first input and output terminal and a second input and output terminal which terminals guide lights along the same light axis so that a first input light is supplied from the first input and output terminal and directed towards the second input and output terminal and a second input light is supplied from the second input and output terminal and directed towards the first in input and output terminal;

first and second optical sensors arranged to have sensing surfaces facing the same direction in parallel to each other;

a beam splitter positioned on the light axis for splitting the first input light into a first sample light to be supplied to the first optical sensor and a first output light to be supplied to the second input and output terminal and for splitting the second input light into a second sample light to be supplied via a reflection means to the second optical sensor and a second output light to be supplied to the first input and output terminal, the beam splitter being angled so as to receive the first and second input lights at 20 to 40 degrees of the angle of incidence; and said reflection means for reflecting the second sample light reflected from the beam splitter to the second optical sensor;

wherein said sensing surfaces of said first and second optical sensors are positioned in parallel to the light axis.

2. The two-way line monitor according to claim 1, wherein:

said two-way line monitor is applied to an optical fiber amplifier; and said reflection means damps the second sample light.

3. The two-way line monitor according to claim 1, wherein:

said beam splitter is angled so as to receive the first and second input lights at approximately 35 degrees of the angle of incidence.

4. A two-way line monitor, comprising:

a first input and output terminal and a second input and output terminal which terminals guide lights in the same light axis so that a first input light is supplied from the first input and output terminal and directed towards the second input and output terminal and a second input light is supplied from the second input and output terminal and directed towards the first input and output terminal;

first and second optical sensors arranged to have sensing surfaces opposing to each other; and a single beam splitter positioned on the light axis for splitting the first input light into a first sample light to be supplied to the first optical sensor and a first output light to be supplied to the second input and output terminal and for splitting the second input light into a second sample light to be supplied to the second optical sensor and a second output light to be supplied to the first input and output terminal, the beam splitter being angled so as to receive the first and second input lights at 20 to 40 degrees of the angle of incidence;

wherein said sensing surfaces of said first and second optical sensors are positioned in parallel to the light axis.

* * * * *

UNITED STATES PATENT AND TRADEMARK OFFICE
CERTIFICATE OF CORRECTION

PATENT NO. : 5,537,500
DATED : July 16, 1996
INVENTOR(S) : Jun YOKOYAMA

It is certified that error appears in the above-indentified patent and that said Letters Patent is hereby corrected as shown below:

Col. 4, Claim 1, line 63, please delete "in"

Signed and Sealed this

First Day of October, 199

Attest:

BRUCE LEHMAN

Attesting Officer     Commissioner of Patents and Trademarks